United States Patent Office 3,061,618
Patented Oct. 30, 1962

3,061,618
3-OXIMES OF 11β,20β-DIHYDROXY-4-PREGNEN-3-ONE AND THE CORRESPONDING 2α-METHYL, 6α-METHYL AND 9α-FLUORO DERIVATIVES THEREOF
William J. Wechter and Douglas G. Anger, Kalamazoo, Mich., assignors to The Upjohn Company, Kalamazoo, Mich., a corporation of Michigan
No Drawing. Filed Oct. 19, 1961, Ser. No. 146,329
10 Claims. (Cl. 260—397.45)

This invention is concerned with novel 3-mono-oximes of 3-keto-11-oxygenated-20-hydroxylated steroid compounds and more particularly with the 3-oximes of 11β, 20β-dihydroxy-4-pregnen-3-one, 2α-methyl-11β,20β-dihydroxy-4-pregnene-3-one, 6α-methyl-11β,20β-dihydroxy-4-pregnene-3-one, 20β-hydroxy-4-pregnene-3,11-dione and 9α-fluoro-11β,20β-dihydroxy-4-pregnen-3-one.

The novel compounds and process of the present invention are illustratively represented by the following formulae:

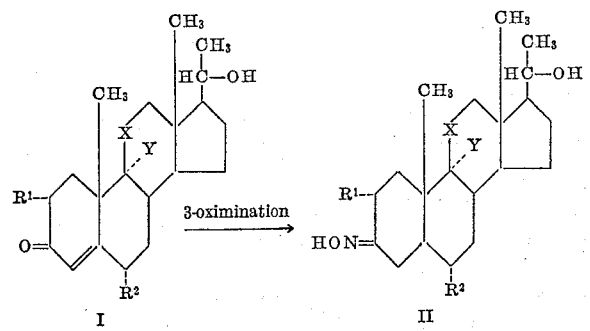

wherein X is selected from the group consisting of the β-hydroxymethylene radical

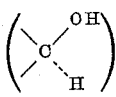

and the carbonyl radical (>C=O); Y is selected from the group consisting of hydrogen and fluorine; R¹ and R² are selected from the group consisting of hydrogen and α-methyl, with the proviso that when R¹ is hydrogen, R² is selected from the group consisting of hydrogen and α-methyl and when R¹ is α-methyl, R² is hydrogen.

The compounds of this invention occur in their 3-syn form, 3-anti form and as mixtures of these two isomers. Illustratively, the 3-mono-oximes of 11β,20β-dihydroxy-4-pregnen-3-one (II) in the anti and syn-forms have the following configurations:

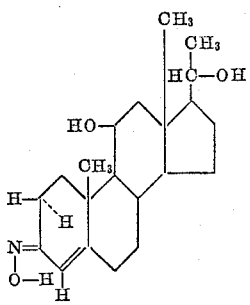

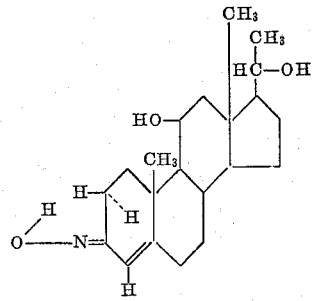

In this specification and claims, the term HON= when attached to the 3-carbon atom of the steroid nucleus denotes the 3-anti form, the 3-syn form and mixtures thereof.

The compounds of the present invention, that is, the 3-mono-oximes of 11β,20β-dihydroxy-4-pregnen-3-one (II), 2α-methyl-11β,20β-dihydroxy-4-pregnen-3-one (II), 6α-methyl-11β,20β-dihydroxy-4-pregnen-3-one (II), 20β-hydroxy-4-pregnene-3,11-dione (II), and 9α-fluoro-11β,20β-dihydroxy-4-pregnen-3-one (II), are central nervous system depressants, useful as tranquilizers, anti-convulsants, muscle relaxants and sedatives in the treatment of hypertension, nervous disorders and related illnesses in both humans and valuable domestic animals. These compounds exist and can be used in both hydrated and anhydrous form.

The compounds of the present invention can be prepared and administered to mammals, birds, humans and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs. Either the pure 3-syn or 3-anti isomers or equilibrium mixtures thereof can be used in such compositions.

The 3-mono-oxime compounds (II) of the present invention are prepared from their corresponding 3-keto compounds (I) by 3-mono-oximation, e.g., by reaction with hydroxylamine or hydroxylamine mineral acid salts such as hydroxylamine hydrochloride.

Starting materials employed in the process for preparing the novel 3-mono-oximes of the present invention are the known 11β,20β-dihydroxy-4-pregnen-3-one (I), 2α-methyl-11β,20β,-dihydroxy-4-pregnen-3-one (I), 6α-methyl-11β,20β-dihydroxy-4-pregnen-3-one (I), 20β-hydroxy-4-pregnene-3,11-dione (I) and 9α fluoro-11β,20β-dihydroxy-4-pregnen-3-one (I), prepared in the manner set forth in part (a) of Example 5, below.

The process of the present invention comprises treating a compound selected from one of the above-disclosed 3-keto-11-oxygenated-20-hydroxyl starting materials with a mineral acid salt of hydroxylamine such as hydroxylamine hydrochloride or hydroxylamine sulfate in a suitable solvent such as (1) an alkanol, for example, methanol, ethanol, propanol, isopropanol, butanol or (2) a tertiary amine, for example, pyridine, collidine, N,N-dimethylaniline and the like, or preferably (3) an alcohol in the presence of a basic reagent such as a tertiary amine, sodium or potassium hydroxides, carbonates or acetates, to give the corresponding 3-mono-oxime. In carrying out this 3-oximation process, an excess of hydroxylamine salt, usually from two to six molar equivalents is preferably employed. Alternatively, hydroxylamine itself can be used in place of the hydroxylamine salt and base.

The 3-mono-oximation reaction is preferably carried out at 20 to 120° C., and conveniently at the reflux temperature of the reaction mixture. Under these conditions, the reaction time is usually from 15 minutes to 8 hours. Both higher and lower temperatures and shorter and longer reaction times are operative, the lower temperature usually requiring a correspondingly longer reaction time.

The 3-mono-oximes of 11β,20β-dihydroxy-4-pregnen-3-one (II), 2α-methyl-11β,20β-dihydroxy-4-pregnen-3-one (II), 6α-methyl-11β,20β-dihydroxy-4-pregnen-3-one (II), 20β-hydroxy-4-pregnene-3,11-dione (II) and 9α-fluoro-11β,20β-dihydroxy-4-pregnen-3-one (II), thus produced, can be isolated from the reaction mixture by conventional methods, for example, when a water-miscible solvent is used, by pouring the reaction mixture into water and separating the resultant precipitate by filtration. Additional purification of the product can be accomplished by conventional methods, for example, by elution chromatography from an adsorbent column with suitable solvents, such as, acetone, methanol, dilute methanol, ethanol, ether, methylene chloride and Skellysolve B, mixtures and combinations of these solvents; also by gradient elution chromatography from an adsorbent column with a suitable mixture of solvents, such as, methylene chloride-Skellysolve B (hexanes), acetone-Skellysolve B, and the like.

The mixtures of syn and anti isomers obtained in the above-disclosed process or by equilibration of these products, can be separated by procedures known in the art for isolating components of mixtures of geometrical isomers, for example, by fractional crystallization, chromatography, selective leaching, or a combination of these methods.

EXAMPLE 1

*11β,20β-Dihydroxy-4-Pregnen-3-One-3-Oxime (II)*

5 g. of a mixture of 11β,20β-dihydroxy-4-pregnen-3-one (I) (85%) and 11β,20α-dihydroxy-4-pregnen-3-one (I) (15%) (prepared in the manner disclosed in Example 2 of U.S. Patent 2,989,550) was dissolved in 100 ml. of alcohol and heated at reflux with 1.25 g. of hydroxylamine hydrochloride and 1.9 g. of sodium acetate in 6.5 ml. of water for a period of about 45 minutes. The solution was diluted with 500 ml. of water and refrigerated; the product was separated by filtration and dried in a vacuum oven to give 4.75 g. of material with a melting point of 114 to 135° C. A sample, recrystallized for analysis from a mixture of methanol and water, had a melting point of 123 to 140° C. and $$\lambda^{C_2H_5OH}_{max} \ 241 \ m\mu \ (\epsilon = 20,050)$$

The nuclear magnetic resonance spectrum of the compound showed that it contained 65±5% of the syn isomer of 11β,20β-dihydroxy-4-pregnen-3-one 3-oxime (II). The infra red spectrum is consistent with such a structure and also was indicative of a hydrate.

*Analysis.*—Calcd. for $C_{21}H_{35}O_3N \cdot H_2O$: C, 68.63; H, 10.15; N, 3.81. Found: C, 68.73; H, 9.51; N, 3.88.

This material is converted to the corresponding anhydrous compound by heating at about 100° C. under high vacuum for a period of about 24 hours.

Several recrystallizations of the 65±5% syn product from hot methanol yield the pure syn isomer of 11β,20β-dihydroxy-4-pregnen-3-one 3-oxime (II). The hot methanol solution (filtrate) was diluted with water to give an amorphous precipitate consisting mostly of 11β,20β-dihydroxy-4-pregnen-3-one 3-oxime (II) in the anti form. This material was suspended in methylene chloride and adsorbed on a column of Florisil (synthetic magnesium silicate). The column was then subjected to gradient elution chromatography with mixtures of 10 to 100% acetone in Skellysolve B (hexanes) and the thus obtained eluate evaporated to dryness to give a solid which was crystallized from a mixture of methanol and water to yield light colored crystals of the anti isomer of 11β,20β-dihydroxy-4-pregnen-3-one 3-oxime (II).

Alternatively, the hot methanol solution (filtrate) (disclosed above) consisting mostly of 11β,20β-dihydroxy-4-pregnene-3-one 3-oxime (II) in the anti form is isolated and purified by fractional crystallization from hot methanol to yield a product composed entirely of the 3-anti isomer.

An equilibrium mixture of the syn and anti isomers is produced by dissolving a sample of either the 3-syn or 3-anti isomer, prepared as above, in pyridine (1% solution) or dilute hydrochloric acid in ethanol and allowing the isomer to remain in contact with this solvent for a period of about 40 hours. The solution is diluted with water to precipitate the mixture of isomers. The fact that both isomers are present in appreciable quantities is established by quantitative infra-red and nuclear magnetic resonance spectra and optical rotation.

EXAMPLE 2

*2α-Methyl-11β,20β-Dihydroxy-4-Pregnen-3-One 3-Oxime (II)*

10 g. of a mixture of 2α-methyl-11β,20β-dihydroxy-4-pregnen-3-one (I) (60 to 80%) and 2α-methyl-11β,20α-dihydroxy-4-pregnen-3-one (I) (20 to 40%) (prepared in the manner disclosed in Example 5 of U.S. Patent 2,989,-550) was dissolved in 200 ml. of hot alcohol and heated at reflux with a mixture of 2.7 g. of hydroxylamine hydrochloride and 4 g. of sodium acetate dissolved in 15 ml. of water, for a period of about 2 hours. The reaction mixture was diluted with 1 l. of water thus precipitating 9.68 g. of product with a melting point of 97 to 120° C. The nuclear magnetic resonance spectrum of this compound showed it to be 90±5% of the anti isomer of 2α-methyl-11β,20β-dihydroxy-4-pregnen-3-one-3-oxime (II). An analytical sample was recrystallized from a mixture of ethanol and water and melted at 126 to 145° C. The infra red spectrum supports the 3-anti oxime structure;

$$\lambda^{C_2H_5OH}_{max} \ 239 \ m\mu \ (\epsilon = 15,250)$$

the compound contains water of hydration.

*Analysis.*—Calcd. for $C_{22}H_{37}O_3 \cdot \frac{1}{4}H_2O$: C, 71.82; H, 10.27; N, 3.81; H$_2$O, .82. Found: C, 71.96; H, 10.26; N, 3.78; H$_2$O, .86.

This material is converted to the corresponding anhydrous compound by heating at 100° C. under high vacuum for a period of about 24 hours.

Several recrystallizations of the 90±5% anti product from hot ethanol-water yields the pure anti isomer of 2α-methyl-11β,20-dihydroxy-4-pregnen-3-one-3-oxime (II). The hot alcohol solution (filtrate) was diluted with water to give an amorphous precipitate consisting mostly of 2α-methyl-11β,20β-dihydroxy-4-pregnen-3-one 3-oxime (II) in the syn form. This material was suspended in methylene chloride and adsorbed on a column of Florisil. The column was then subjected to gradient elution chromatography with mixtures of 10 to 100% acetone in Skellysolve B and the thus obtained eluate evaporated to dryness to give a solid which was crystallized from a mixture of methanol and water to yield light colored crystals of the syn isomer of 2α-methyl-11β,20β-dihydroxy-4-pregnen-3-one 3-oxime (II).

Alternatively, the hot methanol solution (filtrate) (disclosed above) consisting mostly of 2α-methyl-11β,20β-dihydroxy-4-pregnen-3-one 3-oxime (II) in the syn form is isolated and purified by fractional crystallization from hot methanol to yield a product composed entirely of the 3-syn isomer.

An equilibrium mixture of the syn and anti isomers is produced by dissolving a sample of either the 3-syn or 3-anti isomer, prepared as above, in pyridine (1% solution) or dilute ethanolic hydrochloric acid and allowing the isomer to remain in contact with this solvent for a period of about 40 hours, then precipitated with water. The fact that both isomers are present in appreciable quantities is established by quantitative infra-red and nuclear magnetic resonance spectra and optical rotation.

EXAMPLE 3

*20β-Hydroxy-4-Pregnene-3,11-Dione 3-Oxime (II)*

2.2 g. of 20β-hydroxy-4-pregnene-3,11-dione (I) (J. Chem. Soc., page 3426 [1955]) was dissolved in 50 ml. of alcohol and heated at reflux with 0.65 g. of hydroxylamine hydrochloride and 1 g. of sodium acetate in 3.5 ml. of water for a period of about 1 hour. The solution was diluted with 250 ml. of water and refrigerated; the filtered solid was dried in a vacuum oven to give 2.28 g. of material with a melting point of 132 to 143° C. (decomposition). Recrystallization from a mixture of methanol and water yielded 1.7 g. of a product melting at 132 to 147° C. (decomposition). The nuclear magnetic resonance spectrum of this material showed it to be 72±5% of the syn isomer of 20β-hydroxy-4-pregnene-3,11-dione 3-oxime (II). A sample of this material was recrystallized for analysis and melted at 137 to 147° C.; its infra-red spectrum is consistent with the expected structure and its ultra violet absorption

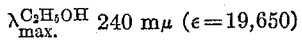
$\lambda_{max}^{C_2H_5OH}$ 240 m$\mu$ ($\epsilon$=19,650)

*Analysis.*—Calcd. for $C_{21}H_{31}O_3N$: N, 4.05. Found: N, 3.91.

Several recrystallizations of the 72±5% syn product from hot methanol yield the pure syn isomer of 20β-hydroxy-4-pregnene-3,11-dione 3-oxime (II). The hot methanol (filtrate) was diluted with water to give an amorphous precipitate consisting mostly of 20β-hydroxy-4-pregnene-3,11-dione 3-oxime (II) in the anti form. This material was suspended in methylene chloride and adsorbed on a column of Florisil. The column was then subjected to gradient elution chromatography eluted with mixtures of 10 to 25% acetone in Skellysolve B and the thus obtained eluate evaporated to dryness to give a solid which was crystallized from a mixture of methanol and water to yield light-colored crystals of the anti isomer of 20β-hydroxy-4-pregnene-3,11-dione 3-oxime (II).

Alternatively, the hot methanol solution (filtrate) (disclosed above) consisting mostly of 20β-hydroxy-4-pregnene-3,11-dione 3-oxime (II) in the anti form is isolated and purified by fractional crystallization from hot methanol to yield a product composed entirely of the 3-anti isomer.

An equilibrium mixture of the syn and anti isomers is produced by dissolving a sample of either the 3-syn or 3-anti isomer, prepared as above, in pyridine (1% solution) or dilute hydrochloric acid in ethanol and allowing the isomer to remain in contact with this solvent for a period of about 40 hours. The solution is diluted with water to precipitate the mixture of isomers. The fact that both isomers are present in appreciable quantities is established by quantitative infra-red and nuclear magnetic resonance spectra and by determination of optical rotation.

EXAMPLE 4

*6α-Methyl-11β,20β-Dihydroxy-4-Pregnen-3-One 3-Oxime (II)*

(a) 35 ml. of pyrrolidine was added dropwise to a hot suspension of 40 g. of 5α-hydroxy-6β-methylpregnane-3,11,20-trione [J. Amer. Chem. Soc. 78, 6213 (1956) (IV)] in 800 ml. of methanol. The steroid dissolved and after cooling and standing for a period of about 15 hours, the 3-enamine began to precipitate. The solution containing the precipitate was concentrated to a volume of about 300 ml. with gentle warming under a stream of nitrogen. After refrigeration for about 4 hours, the product was filtered to yield 37.4 g. of 6-methyl-3-[N-pyrrolidinyl]-3,5-pregnadiene-11,20-dione with a melting point of 165 to 171° C. (decomposition). The 37.4 g. of the thus produced 3-enamine, dissolved in 380 ml. of benzene, was added dropwise to a suspension of 12.5 g. of lithium aluminum hydride in 750 ml. of tetrahydrofuran under nitrogen and stirred for about 40 minutes to give 6-methyl-3-[N-pyrrolidinyl]-11β,20β-dihydroxy-3,5-pregnadiene. To the solution, 85 ml. of ethyl acetate was added cautiously, followed by careful addition with cooling of 200 ml. of water. About 1 l. of organic solvents was distilled off under vacuum; 800 ml. of methanol and 450 ml. of 4% sodium hydroxide solution was added and the mixture stirred for about 15 minutes at a temperature between about 45 and 55° C. The mixture was cooled and 125 ml. of acetic acid slowly added and then all the organic solvents removed under vacuum. 95 ml. of concentrated hydrochloric acid in 650 ml. of water was added and the slurry stirred for a period of about 30 minutes; the solid was recovered by filtration, washed with water and recrystallized from a mixture of acetone and water to yield 16.3 g. of 6α-methyl-11β,20β-dihydroxy-4-pregnen-3-one (I) with a melting point of 150 to 160° C. The mother liquor was retained and gave 4.2 g. of a second crop. Analysis by paper chromatography indicated that in 97% of the product of the first crop, the configuration of the 20-hydroxyl substituent is β, while in 64% of the second crop it is α, The optical rotatory dispersion of the compounds of both crops indicated that the 6-methyl group in each is α-oriented. The compound obtained in the first crop has an infra red absorption spectrum indicative of a hydrate, rotation [α]$_D$ plus 91° (chloroform), λmax. 243 m$\mu$ ($\epsilon$=14,150) and the analysis below.

*Analysis.*—Calcd. for $C_{22}H_{34}O_3 \cdot \frac{3}{4}H_2O$: C, 73.32; H, 9.93. Found: C, 73.44; H, 9.75.

The anhydrous material is prepared by heating at 100° C. for about 24 hours under vacuum.

6α-methyl-11β,20β-dihydroxy-4-pregnen-3-one (I) is a central nervous system stimulant and is useful in the treatment of mental depression, fatigue, narcolepsy and parkinsonism.

(b) 3 g. of 6α-methyl-11β,20β-dihydroxy-4-pregnen-3-one (I) was dissolved in 60 ml. of alcohol and heated at reflux with 0.75 g. of hydroxylamine hydrochloride and 1.1 g. of sodium acetate and 4 ml. of water for a period of about 45 minutes. The solution was diluted with 300 ml. of water and refrigerated; the solid thus precipitated was separated by filtration and dried in a vacuum oven to give 2.85 g. of material with a melting point of 214 to 223° C. (decomposition). The nuclear magnetic resonance spectrum of the material shows that it contains 60±5% of the syn isomer of 6α-methyl-11β,20β-dihydroxy-4-pregnen-3-one 3-oxime (II). A sample of this material was recrystallized from acetone for analysis and melted at 219 to 224° C. (decomposition) with ultra violet absorption λ$_{max.}$ at 241 m$\mu$ ($\epsilon$=16,950). The infra red absorption spectrum agrees with the structure expected for the acetone solvate of the compound of (II), above.

*Analysis.*—Calcd. for $C_{22}H_{35}O_3N \cdot CH_3COCH_3$: C, 71.56; H, 9.85; N, 3.34. Found: C, 71.10; H, 9.81; N, 3.32.

The unsolvated product is prepared by heating the compound obtained above under high vacuum at about 100° C. for about 24 hours, or by melting the solvated compound at atmospheric pressure.

Several recrystallizations of the 60±5% syn product from hot methanol yield the pure syn isomer of 6α-methyl-11β,20β-dihydroxy-4-pregnen-3-one 3-oxime (II). The hot methanol solution (filtrate) was diluted with water to give an amorphous precipitate consisting mostly of 6α-methyl-11β,20β-dihydroxy - 4 - pregnen-3-one 3-oxime (II) in the anti form. This material was suspended in methylene chloride and adsorbed on a column of Florisil (synthetic magnesium silicate). The column was then subjected to gradient elution chromatography with mixtures of 10 to 100% acetone in Skellysolve B (hexanes) and the thus obtained eluate evaporated to dryness to give a solid which was crystallized from a mixture of methanol and water to yield light-colored crystals of the anti isomer of 6α-methyl-11β,20β-dihydroxy-4-pregnen-3-one 3-oxime (II).

Alternatively, the hot methanol solution (filtrate) (disclosed above) consisting mostly of 6α-methyl-11β,20β-dihydroxy-4-pregnene-3-one 3-oxime (II) in the anti form is isolated and purified by fractional crystallization from hot methanol to yield a product composed entirely of the 3-anti isomer.

An equilibrium mixture of the syn and anti isomers is produced by dissolving a sample of either the 3-syn or 3-anti isomer, prepared as above, in pyridine (1% solution) or dilute hydrochloric acid in ethanol and allowing the isomer to remain in contact with this solvent for a period of about 40 hours, then precipitated with water. The fact that both isomers are present in appreciable quantities is established by quantitative infra-red and nuclear magnetic resonance spectra and by determination of optical rotation.

EXAMPLE 5

9α - Fluoro - 11β,20β - Dihydroxy - 4 - Pregnen - 3 - One 3 - Oxime (II); 9α - Fluoro - 11β,20α - Dihydroxy - 4 - Pregnen-3-One 3-Oxime (II).

(a) 20 ml. of pyrrolidine was added dropwise to a hot suspension of 20 g. of 9α-fluoro-11β-hydroxyprogesterone [J. Amer. Chem. Soc. 77, 1068 (1955)] in 400 ml. of methanol. The steroid dissolved and after standing for about 15 hours, the 3-enamine began to precipitate. The solution containing the precipitate was concentrated to a volume of about 150 ml. with warming under a stream of nitrogen. After about 4 hours under refrigeration, the product was filtered to yield 20 g. of 9α-fluoro-11β-hydroxy - 3 - [N - pyrrolidinyl] - 3,5 - pregnadiene-20-one. 20 g. of thus produced 3-enamine, in 200 ml. of benzene, was added dropwise to a suspension of 7 g. of lithium aluminum hydride in 400 ml. of tetrahydrofuran and stirred for about 40 minutes under nitrogen to give a mixture of 9α-fluoro-11β,20β-dihydroxy-3-[N-pyrrolidinyl] - 3,5 - pregnadiene and 9α - fluoro - 11β,20α-dihydroxy - 3 - [N - pyrrolidinyl] - 3,5 - pregnadiene. To this solution, 45 ml. of ethyl acetate was cautiously added, followed by careful addition with cooling of 100 ml. of water. About 500 ml. of organic solvents was distilled off under vacuum; 400 ml. of methanol and 225 ml. of 4% sodium hydroxide solution was added and the mixture stirred for about 15 minutes at a temperature between about 45 and 55° C. The mixture was cooled and 75 ml. of acetic acid slowly added and then all of the organic solvents removed under vacuum. 50 ml. of concentrated hydrochloric acid in 325 ml. of water was added and the slurry stirred for a period of about 30 minutes; the solid was recovered by filtration, washed with water and recrystallized from a mixture of acetone and water to yield a mixture of 9α-fluoro-11β,20β-dihydroxy-4-pregnen-3-one (I) and 9α-fluoro-11β,20α-dihydroxy-4-pregnen-3-one (I). The mixture of 11β,20β and 11β,20α-dihydroxy compounds is separated by chromatography over Florisil using increasing proportions of acetone and Skellysolve followed by crystallization to produce the pure 20-isomers. These crystalline fractions have ultraviolet absorption maxima at 238 to 242 mμ and lack the infrared absorption band at about 1685 to 1710 cm.$^{-1}$ characteristic of the 20-ketone. Upon acetylation, the α- and β-isomers are readily distinguished; the 20α shows a negative change in molecular rotation while the 20β-isomer exhibits a positive change.

(b) 3 g. of 9α-fluoro-11β,20β-dihydroxy-4-pregnen-3-one (I) was dissolved in 60 ml. of alcohol and heated at reflux with 0.75 g. of hydroxylamine hydrochloride and 1.1 g. of sodium acetate and 4 ml. of water for a period of about 45 minutes. The solution was diluted with 300 ml. of water and refrigerated; the precipitated product was separated by filtration and dried in a vacuum oven to give the desired 3-oxime. Recrystallization from acetone yields light-colored crystalline 9α-fluoro-11β,20β-dihydroxy-4-pregnen-3-one 3-oxime (II).

(c) Following the procedure of (b), above, but substituting 9α - fluoro - 11β,20α - dihydroxy - 4 - pregnen-3-one (I) as starting material, yields light-colored crystalline 9α - fluoro - 11β,20α - dihydroxy - 4 - pregnen-3-one 3-oxime (II).

(d) Following the procedure of (b), above, but substituting the unseparated mixture of 9α-fluoro-11β,20β-dihydroxy - 4 - pregnen - 3 - one (I) and 9α - fluoro - 11β,20α-dihydroxy-4-pregnen-3-one (I) obtained in (a), above, as starting material, yields a mixture of light-colored crystalline 9α - fluoro - 11β,20β - dihydroxy - 4 - pregnen-3 - one 3 - oxime (II) and 9α - fluoro - 11β,20α - dihydroxy-4-pregnen-3-one 3-oxime (II).

(e) The 3-oximes of (b) and (c), above, when obtained as the 3-syn isomer is converted to the 3-anti form and the equilibrium mixture of the 3-syn and 3-anti isomer by following the procedure disclosed in Example 1. Conversion of the 3-anti isomer to the 3-syn form and the equilibrium mixture of the 3-syn and 3-anti isomers is carried out by the method set forth in Example 2.

EXAMPLE 6

9α - Fluoro - 11β - 20β - Dihydroxy - 4 - Pregnen - 3 - One 3 - Oxime (II)

9α-fluoro-11β-hydroxyprogesterone is converted to 9α-fluoro - 11β,20β - dihydroxy - 4 - pregnen - 3 - one (I) by selective reduction with sodium borohydride in accordance with the procedure of Norymberski et al. [J. Chem. Soc., page 3426 (1955)]. The thus produced 11β,20β-dihydroxy compound (I) is subjected to 3-oximation by reaction with hydroxylamine hydrochloride and sodium acetate (in the manner disclosed in Examples 1 to 5) to yield 9α-fluoro-11β,20β-dihydroxy-4-pregnen-3-one 3 oxime (II). This 3-oxime is converted to either the 3-syn or 3-anti isomer or equilibrium mixture of these two isomers in the manner disclosed in Examples 1 and 2.

EXAMPLE 7

9α - Fluoro - 20β - Hydroxy - 4 - Pregnene - 3,11 Dione 3-Oxime (II)

Following the procedure of Example 6 but substituting 9α-fluoro-11-ketoprogesterone, as starting material, yields 9α - fluoro - 20β - hydroxy - 4 - pregnene - 3,11 - dione 3-oxime (II) as either the 3-syn or 3-anti isomer or equilibrium mixture thereof.

EXAMPLE 8

2α - Methyl - 20β - Hydroxy - 4 - Pregnene - 3,11 - Dione 3-Oxime (II)

Following the procedure of Example 6 but substituting 2α - methyl - 11 - ketoprogesterone as starting material, yields 2α - methyl - 20β - 4 - pregnene - 3,11 - dione 3-oxime (II) as either the 3-syn or 3-anti isomer of equilibrium mixture thereof.

EXAMPLE 9

6α - Methyl - 20β - Hydroxy - 4 - Pregnene - 3,11-Dione 3-Oxime (II)

Following the procedure of Example 6, but substituting 6α-methyl-11-ketoprogesterone as starting material, yields 6α - methyl - 20β - hydroxy - 4 - pregnene - 3,11-dione 3-oxime (II) as either the 3-syn or 3-anti isomer or equilibrium mixture thereof.

We claim:
1. 3-oximes of the formula

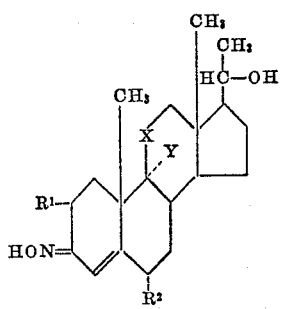

wherein X is selected from the group consisting of the β-hydroxymethylene radical

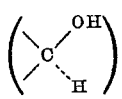

and the carbonyl radical (>C=O); Y is selected from the group consisting of hydrogen and fluorine; $R^1$ and $R^2$ are selected from the group consisting of hydrogen and α-methyl, with the proviso that when $R^1$ is hydrogen, $R^2$ is selected from the group consisting of hydrogen and α-methyl and when $R^1$ is α-methyl, $R^2$ is hydrogen.

2. 11β,20β-dihydroxy-4-pregnen-3-one 3-oxime.
3. 11β,20β - dihydroxy - 4 - pregnen - 3 - one 3-oxime·H$_2$O.
4. 2α - methyl - 11β,20β - dihydroxy - 4 - pregnen - 3-one 3-oxime.
5. 2α - methyl - 11β,20β - dihydroxy - 4 - pregnen - 3-one 3-oxime·¼ H$_2$O.
6. 6α-methyl-11β,20β-dihydroxy-4-pregnen-3-one 3-oxime.
7. 6α - methyl - 11β,20β - dihydroxy - 4 - pregnen - 3-one 3 oxime·CH$_3$COCH$_3$.
8. 20β-hydroxy-4-pregnene-3,11-dione 3-oxime.
9. 9α-fluoro-11β,20β-dihydroxy-4-pregnen-3-one 3-oxime.
10. 6α-methyl-11β,20β-dihydroxy-4-pregnen-3-one.

References Cited in the file of this patent
UNITED STATES PATENTS 2,628,966    Graber et al.  ----------  Feb. 17, 1953
2,989,550    Nathan et al.  ----------  June 20, 1961

OTHER REFERENCES

Oliveto et al., J.A.C.S. 78, pp. 1736–37 (1956).